United States Patent [19]

Pelletier et al.

[11] Patent Number: 4,742,185
[45] Date of Patent: May 3, 1988

[54] TROLLEY BUS HEAD

[75] Inventors: Yves Pelletier, Les Mureaux; Max Dumontet, Pantin, both of France

[73] Assignee: Delachaux S.A., France

[21] Appl. No.: 932,466

[22] Filed: Nov. 18, 1986

[30] Foreign Application Priority Data

Nov. 20, 1985 [FR] France ................................. 85 17165
Jun. 20, 1986 [FR] France ................................. 86 08936

[51] Int. Cl.$^4$ ............................................. B60L 5/06
[52] U.S. Cl. ...................................... 191/59.1; 191/50
[58] Field of Search ................. 191/59.1, 59, 45 R, 191/60, 60.1, 60.4, 72, 50, 55, 62, 65; 310/245, 246, 247, 241, 242

[56] References Cited

U.S. PATENT DOCUMENTS 2,185,270 1/1940 Ryan ................................. 191/59.1
4,088,912 5/1978 Yoshida ............................ 310/246 X
4,431,933 2/1984 Mabuchi .......................... 310/242 X

FOREIGN PATENT DOCUMENTS 511218 1/1955 Italy ................................. 191/59.1
150120 9/1920 United Kingdom ............... 191/59.1

Primary Examiner—James T. McCall

[57] ABSTRACT

The invention relates to a trolley bus head comprising a moving cradle receiving a replaceable wiper for transmitting electrical current to a cable carried by the trolley pole. In accordance with the invention the cradle (6) comprises a main body (8) and a moving portion (13) which is latchable against said main body, with a spring member (23) pressing the replaceable wiper (10) against a support and contact face of the main body when said moving portion is in its latched position. The invention is applicable to providing heads for trolley buses or similar vehicles which are powered from an overhead conductor.

21 Claims, 4 Drawing Sheets

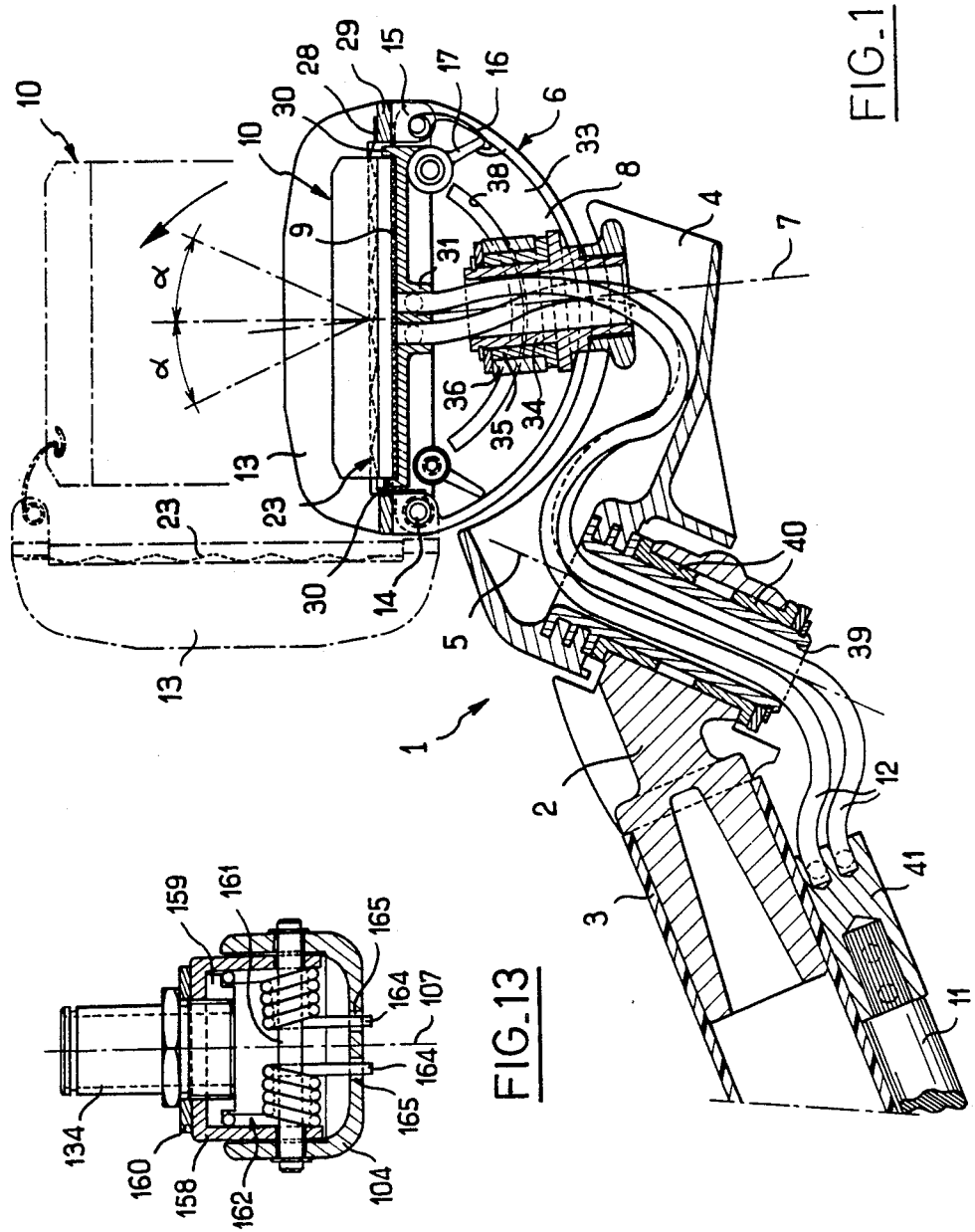

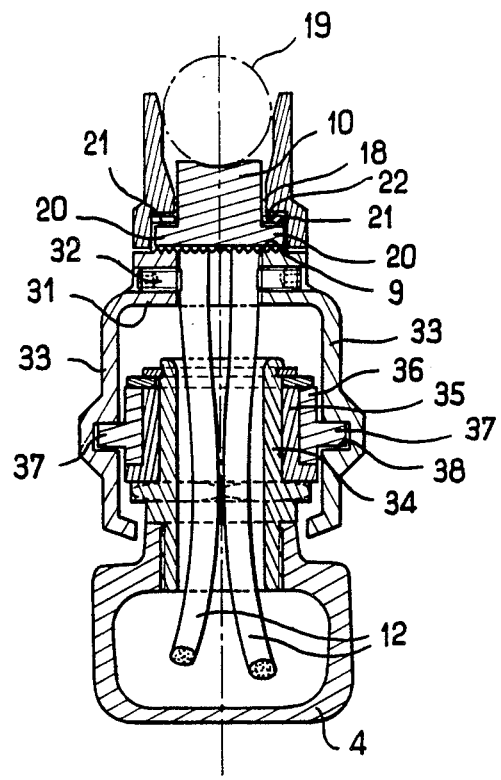
FIG._2
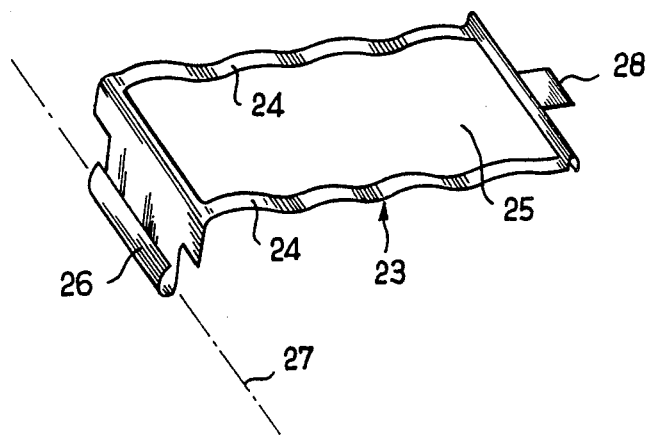
FIG._3

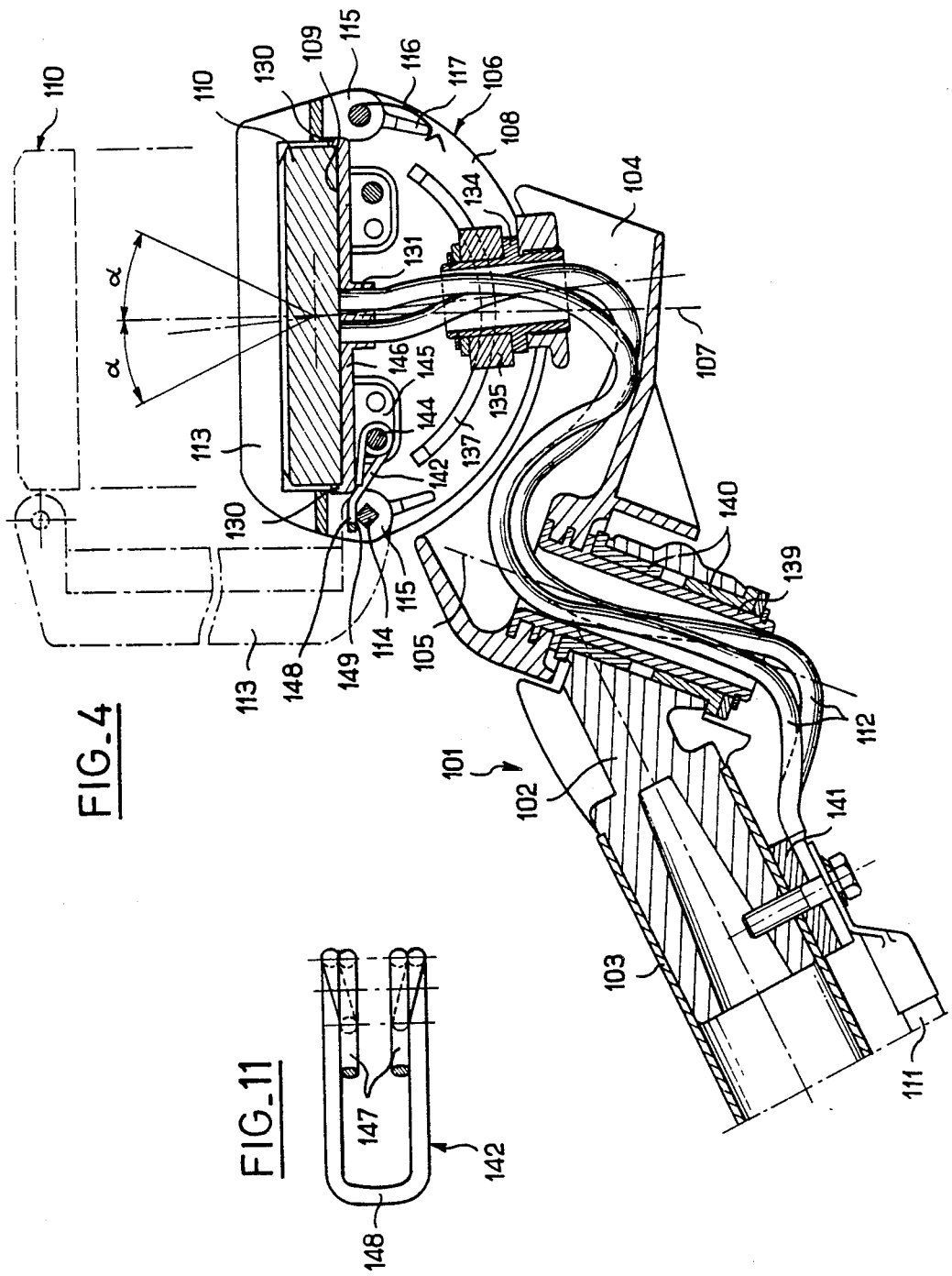

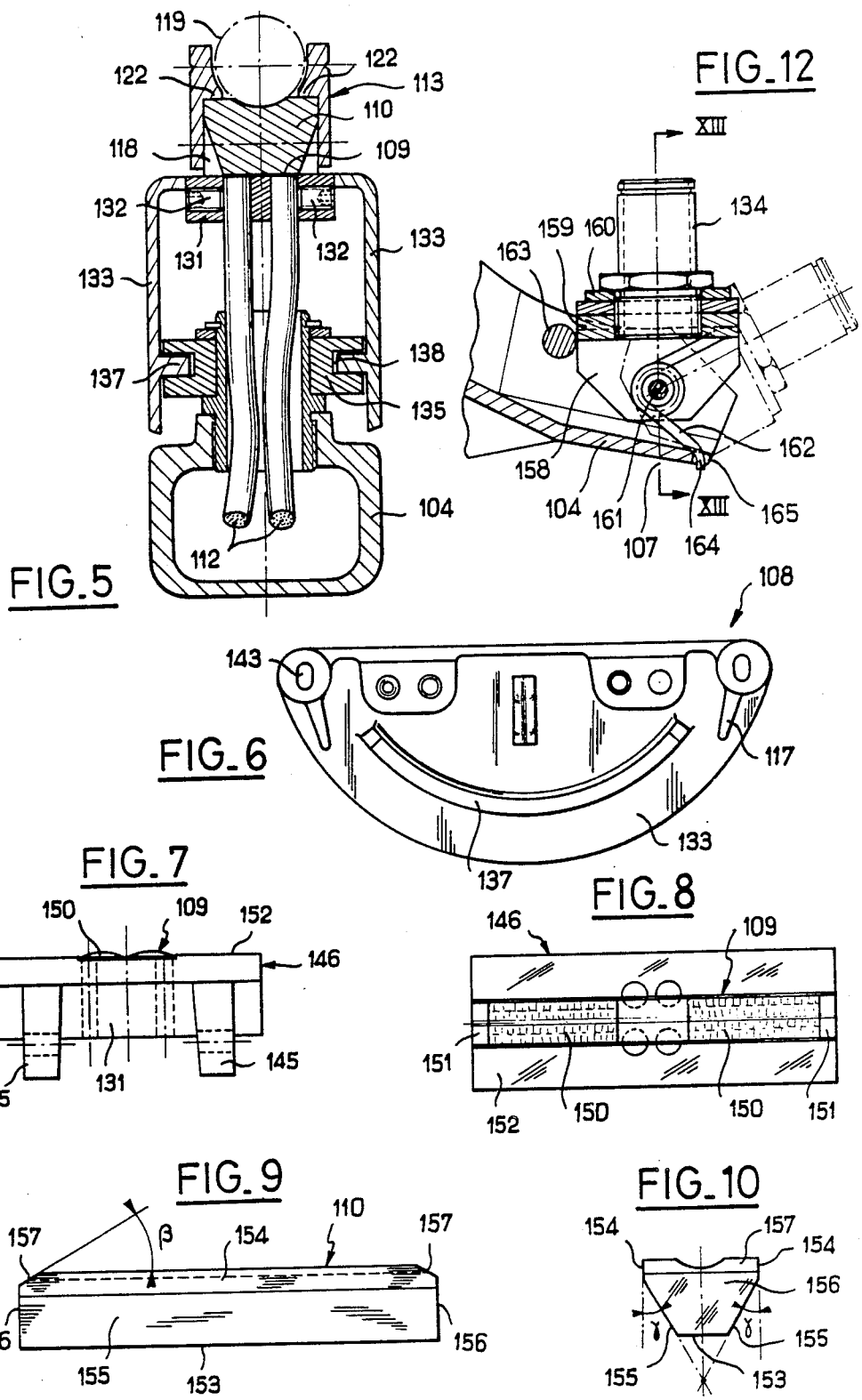

TROLLEY BUS HEAD

The present invention relates to trolley buses and similar vehicles, and more particularly to a trolley bus head of the type comprising a cradle swivel pivotally mounted at the end of the pole, a cradle mounted on the cradle swivel by means of a connection allowing it to oscillate about a substantially vertical axis and to rock about a substantially horizontal axis, said cradle receiving a replaceable wiper for transmitting electric current to a cable carried on the pole, via shunt connected to the cradle.

BACKGROUND OF THE INVENTION

In some prior trolley bus heads, the top of the cradle includes a wiper-carrier part having a groove with inclined faces. A replaceable wiper is received by conical wedging in the groove of said wiper-carrier part and a safety plate is provided to prevent the replaceable wiper being extracted during reversing, given that the conical wedging effect is naturally disposed to tend to increase clamping while the trolley bus is moving forwards.

The wiper is worn away and must be changed very often, often as much as once a day. Thus, although such a sliding and wedging mounting is mechanically safe, it suffers from being difficult to disassemble: the operator must begin by unscrewing the safety plate and then take a tool for applying a shock to extract the replaceable wiper, and then re-assemble in reverse order using a new wiper.

Further, the replaceable wiper is relatively expensive to manufacture by virtue of its inclined slope surfaces: it must be machined from a part cut out from a plate, and the machining must be to within tight tolerances in order to ensure that adequate electric contact is made with the corresponding faces in the wiper-receiving groove in the wiper-carrier. Published French patent application No. 2,320,204 gives an illustration of a wiper of this type for use with a head which comprises a wiper mounted at each end of a rocker arm.

However, electrical contact is not as good as it should be because of friction between the smooth surfaces of the replaceable wiper and of the wiper-carrier, with the smooth nature of these surface being essential by virtue of the wiper being received in its carrier by sliding: it turns out that contact is limited to localized zones or points, which not only have an effect on the quality of the contact for current transmission purposes, but also runs the danger of giving rise to unwanted heating by virtue of the current being concentrated in just a few zones.

Other prior trolley bus heads use a replaceable wiper which is not received by sliding, and make use of a two-part cradle with the parts being bolted together.

Swiss patent No. 359,463 describes a trolley bus head including a top portion which is bolted on either side of a longitudinal mid plane, thereby holding a replaceable wiper against a smooth support and contact face.

In practice, bolting is not a satisfactory way of holding a wiper. Firstly the torque exerted on the bolts must be accurately applied since too little torque leaves a loose assembly with consequent poor electrical contact while too much torque runs the risk of cracking the replaceable wiper. Secondly, the machining tolerances both for the wiper and for the corresponding portions of the cradle are necessarily tight. Finally, when replacing a wiper, the head cannot be disassembled rapidly since the bolts must first be undone and then they must be re-tightened accurately.

German patent No. 974,463 describes a technique similar to the above technique but in which the bolting takes place in a longitudinal mid plane. The quality of the electric contact is improved relative to the head described in the above-specified Swiss patent by virtue of two flat contact blades sandwiched between the replaceable wiper and a support face of the cradle, however the above-mentioned drawbacks concerning rigidly maintaining a replaceable wiper by bolting remain.

Generally speaking, with the trolley bus heads described in the above-specified German and Swiss patents, it should be observed that the contact obtained between the replaceable wiper and the associated support face occurs, in point of fact, at a few points only. This makes it important to have a wiper whose bottom face is large: and given that the wiper must be also be sufficiently rigid to withstand the compression forces exerted thereon during clamping, the resulting wiper cannot avoid being bulky, and thus relatively expensive per wiper.

The state of the art may finally be illustrated by U.S. Pat. No. 2,508,531 which also describes the use of bolts for retaining a wiper. The cradle in the trolley bus head described has cooling side fins, which shows the extent to which there are overheating problems to be overcome. Preferred implementations of the present invention provide a trolley bus head which is more effective than those mentioned above.

More particularly, preferred implementations of the invention enable the head to be rapidly and easily dismounted without using special tools in order to replace a worn wiper.

In addition, preferred implementations of the invention make it possible to use a replaceable wiper whose shape is suitable for cheap mass production, in particular by using drawing means, while still providing good electrical contact.

SUMMARY OF THE INVENTION

The present invention provides a trolley bus head comprising a cradle swivel pivotally mounted at the end of a pole, a cradle mounted on the cradle swivel by means of a connection allowing oscillation about a substantially vertical axis and rocking about a substantially horizontal axis, said cradle receiving a replaceable wiper for transmitting current to a cable mounted on the pole via a shunt connected to the cradle, the head including the improvement whereby the cradle comprises a main body having a support and contact face for engaging a bottom portion of the replaceable wiper, and a moving portion which is latchable on said main body, said moving portion being hinged about an axis carried on said main body and having a longitudinal opening through which a top portion of the replaceable wiper passes, resiliently deformable means being provided for holding the replaceable wiper against the support and contact face when the moving portion is latched against the main body.

In particular, in a first variant trolley bus head the replaceable wiper has two longitudinally extending fins at the bottom thereof for co-operating with the moving portion of the cradle in order to hold said replaceable wiper against the support and contact face using said resiliently deformable means.

Preferably, in order to press the replaceable wiper properly against the support and contact face the resiliently deformable means comprise two corrugated branches, with each corrugated branch being housed, when said moving portion is latched against the main body, between a corresponding longitudinally extending fin of the replaceable wiper and an associated rim provided on the moving portion of the cradle in the vicinity of its longitudinal opening. In order to avoid any risk of losing or misplacing the resiliently deformable means, the resiliently deformable means are preferably in the form of a single part carried by the moving portion of the cradle.

In which case, the single part constituting said deformable resilient means advantageously has a connection tab which surrounds the hinge axis of the moving portion of the cradle. This single part is then generally rectangular in shape having an opening for passing the top portion of the replaceable wiper.

In order to provide high quality contact for transmitting current from the replaceable wiper, it is advantageous for the main body of the cradle to have a support and contact face covered with diamond-shaped points, which cannot be done when the wiper is received by sliding as in the prior art. The main body of the cradle may be provided with an abutment located at each end of its support and contact face to hold the replaceable wiper against longitudinal displacement.

The structure of the replaceable wiper and of the associated support and contact face make it possible to achieve a particularly compact and satisfying disposition for the connection shunt, which used to be connected at the rear end of the wiper-carrier: in this case the main body of the cradle has a central connection portion which receives one end of a shunt which reaches the cradle by passing through the center of the oscillating connection to the cradle.

In a second variant of a trolley bus head in accordance with the invention the moving portion of the cradle is hinged about a shaft mounted on the main body of said cradle, said shaft being mounted free to move transversely in a direction which is substantially perpendicular to the support and contact face, said moving portion including two rims in the vicinity of the longitudinal opening and coming into direct contact with top side edges of the replaceable wiper, and wherein said resiliently deformable means comprise a spring member acting on the hinge shaft in such a manner as to exert a force on the moving portion of the cradle suitable for maintaining the replaceable wiper against the support and contact face.

The first variant trolley bus head suffers from drawbacks in some applications, and particularly when the resiliently deformable means are made in the form of a spring element comprising two corrugated branches. The replaceable wiper is held in this particular embodiment by thrust from the two corrugated branches against associated longitudinal fins provided at the base of said wiper with said thrust being due to the action of a pair of longitudinal rims provided on the moving portion of the cradle, i.e. with each corrugated branch being sandwiched between an upper cradle rim and a lower wiper fin. However, when passing certain types of line arrangement (cross-overs, points, etc.), contact is no longer provided by the wiper. At such moments current passes through the cheeks or side portions of the moving portion of the cradle whose primary function is to guide the wiper against the pickup wire. If a corrugated branch spring member is used, it may then be subjected to surge currents of up to 500 amps, for example, and such currents may destroy it.

It is thus advantageous to have a trolley bus head in which the cheeks of the moving portion of the cradle can provide electrical contact as said head passes through such a line arrangement without the current passing through a spring, and this advantageous result is obtained with the second variant in which the moving portion is mounted floating by virtue of its hinge axis being displaceable.

In particular the main body of the cradle includes oblong bearings receiving the ends of the hinge shaft.

Preferably the spring member is a torsion spring mounted on the main body of the cradle and having at least one branch pressing against the hinge shaft; in addition, it is advantageous for the hinge shaft to have a sharp edge against which the branch of the torsion spring presses when the moving portion of the cradle is in the latched position.

Advantageously, the resiliently deformable means include a latching clip mounted on the other end of the moving portion of the cradle; the moving portion of the cradle then has a floating mount with two degrees of freedom.

Advantageously, the support and contact face is essentially constituted by contact blades having a degree of resilience and disposed on the top face of the main body of the cradle; such blades provide good contact while still taking up slack against the contact face of the wiper which is made by molding or drawing a uniform section bar from carbon-impregnated composite material. Preferably, the contact blades are in the form of at least one plate disposed in a longitudinal groove on the main body of the cradle; in particular, two such plates are provided, disposed on either side of a central connection portion of the main body of the cradle for receiving one end of a shunt which passes through the mountings allowing the cradle to swivel and oscillate.

The invention also provides a replaceable wiper for fitting to a trolley bus head as defined above, said wiper being constituted by an elongate body of essentially constant cross-section, said cross-section being substantially trapezoidal in shape with the small base corresponding to a bottom plane face pressing against the support and contact face of the main body of the cradle.

Preferably, the replaceable wiper includes two parallel facets adjacent to the top side edges thereof against which associated rims of the moving portion of the cradle are pressed, followed by two inclined faces running to said bottom plane face of said replaceable wiper; and in particular each of said inclined faces is at an angle of about 30° with the adjacent facet.

BRIEF DESCRIPTION OF THE DRAWINGS

Embodiments of the invention are described by way of example with reference to the accompanying drawings, in which:

FIG. 1 is a section through a trolley bus head in accordance with a first variant of the invention and shown in its operating position, with the wiper-replacing position being shown by means of dot-dashed lines (the moving portion of the cradle being unlatched and lifted open to allow the replaceable wiper to be immediately removed);

FIG. 2 is a cross-section through the FIG. 1 head with the plane of the section passing through the substantially vertical oscillation axis of the cradle, thereby showing how the replaceable wiper is held against the associated support and contact face;

FIG. 3 is a perspective view of a spring element normally carried by the hinge axis of the moving portion of the cradle and including a cutout for properly holding the replaceable wiper when said moving portion is latched on the main body;

FIG. 4 is a section similar to FIG. 1 through a trolley bus head in accordance with a second variant of the invention and shown in its operating position, with the wiper-replacing position being shown in dot-dashed lines (with the moving portion cradle being shown unlatched and lifted open to enable immediate extraction of the replaceable wiper);

FIG. 5 is a cross-section through the FIG. 4 head on a section plane passing through the substantially vertical oscillation axis of the cradle, thereby showing how the replaceable wiper is held against the associated support and contact face virtue of direct thrust from the moving portion of the cradle;

FIG. 6 is a plane view of a side plate of the main cradle body and shows, in particular, the oblong bearing which allows the hinge axis of the moving portion of the cradle to move;

FIGS. 7 and 8 are respectively an end view and a plan view seen from above of the support plate of the main body of the cradle receiving the contact blades against which the replaceable wiper is held;

FIGS. 9 and 10 are respectively a plan view and an end view of a replaceable wiper in accordance with the invention, and intended for fitting to an improved trolley bus head as illustrated in preceding figures;

FIG. 11 is a plan view to a larger scale of the torsion spring which acts on the hinge axis of the moving portion of the cradle in order to hold the replaceable wiper against the support and contact face when the cradle is in its latched position;

FIG. 12 is a section through a detail of a variant connection between the pole and the cradle, in which an additional hinge allows said cradle to be retracted when the trolley bus head escapes from the pickup line and comes into contact with a transverse line from which said pickup line is suspended; and FIG. 13 is a section on line XIII—XIII of FIG. 12.

MORE DETAILED DESCRIPTION

FIGS. 1 and 2 show a trolley bus head in accordance with the invention and mounted at the end of a trolley bus pole.

In conventional manner, the head 1 has various component parts whose disposition allows the head to have several degrees of freedom relative to the pole. Thus, there is a pole end fitting 2 conventionally made as an aluminum casting and mounted coaxially (by gluing or by any other appropriate means) on the end of an insulating tube 3 which constitutes the pole per se and most of which is not shown in the figures. The pole end fitting 2 is hinged to a part 4 referred to as a cradle swivel and capable of pivoting about a slanting axis 5 through a predetermined angular range (with stops, not shown, delimiting such pivoting to 90° on either side of a middle position corresponding to the pole lying in the same vertical plane as the pickup line). The swivel 4 has the cradle 6 mounted thereon via a connection which allows the cradle 6 to oscillate about a substantially vertical axis 7, again between stops, no shown, for limiting the angular range of permissible oscillation, with said cradle 6 being also capable of rocking about a substantial horizontal axis. It may be observed that the connection between the cradle 6 and the cradle swivel 4 is not constituted by a ball-and-socket joint as has been common practice in the past, but is provided by two specified axes, thereby providing various advantages which are described below. For example, the axes 5 and 7 are disposed at an angle between each other of 15° to 25°, so as to obtain good performance from the trolley bus head even when turning a sharp corner.

In accordance with an essential aspect of the invention, the cradle 6 comprises a main body 8 having a support and contact face 9 for the bottom portion of a replaceable wiper 10, which wiper is used for transmitting electrical current to a cable 11 mounted on the pole via a shunt 12 which is connected to the cradle; with said cradle also including a moving portion 13 which is hinged to the main body 8 and which is latchable thereto, said moving portion including a longitudinal opening through which the top portion of a replaceable wiper 10 passes.

Thus, when the moving portion 13 is unlatched and is moved away from the main body 8 of the cradle, an operator has immediate access to the replaceable wiper 10, thereby enabling the wiper to be replaced very quickly, whereas when said moving portion is in its latched position, said replaceable wiper 10 is securely held against the support and contact face 9 by means of resiliently deformable means described below in greater detail with reference to FIG. 3 which illustrates a particularly advantageous spring member for the present application.

By virtue of the replaceable wiper being mounted without being received by sliding, said wiper may readily be made from a bar of uniform cross-section, which cross-section is more clearly visible in FIG. 2. This makes for cheaper manufacture since the wiper may be taken from a rolled or drawn bar of uniform cross-section. In order to replace the replaceable wiper, all that an operator needs to do is unlatch the moving portion of the cradle so as to be able to remove the worn wiper by hand and immediately replace it with a new wiper, likewise by hand, and then the operator closes the moving portion and latches it in the closed position. These operations are thus particularly easy for the operator who can therefore replace the worn wiper very quickly and without needing to use any particular tools.

The embodiment shown in FIGS. 1 and 2 comprises a moving cradle portion 13 hinged about a fixed shaft 14 carried by the main body 18 of said cradle. The moving portion 13 is symmetrical in shape, having a pair of lugs 15 at each end, with one pair serving to provide a hinge and with the other pair serving to carry a resilient latch 16 for co-operating in the latching position with a molding 17 provided for latching purposes on the main body of the cradle. The moving portion of the cradle has a longitudinal opening 18 which is substantially rectangular in shape and through which the top portion of a replaceable wiper passes between two side plates of the moving portion which are provided in conventional manner for providing lateral guidance relative to the pickup line 19, as can be seen most clearly in FIG. 2.

The replaceable wiper 10 thus has two longitudinal fins 20 at the bottom thereof downwardly defining the face of the wiper for being pressed against the support and contact face 9, and upwardly defining two bearing faces 21 which receive force from resiliently deformable means for pressing the wiper against support and contact face and which are disposed between said thrust faces and an associated rim 22 provided on the moving portion of the cradle in the vicinity of its longitudinal opening 18.

The resiliently deformable means are advantageously constituted by a single member 23 whose shape is shown in perspective in FIG. 3. This single member comprises two corrugated branches 24 which are received, when the moving portion of the cradle is in its latched position, between the longitudinal fins 20 of the replaceable wiper and the above-mentioned rims 22 of said moving portion. The single member is generally rectangular in shape having an opening 25 which provides an opening for passing the top portion of the replaceable wiper, with one side of the rectangular shape having a link tab 26 for receiving the hinge axis of the moving portion of the cradle (represented by axis 27 in FIG. 3), and with the other side having a tab 28 for holding said resilient member 23 in position by pressing against a transverse portion 29 of the moving portion of the cradle (see FIG. 1). This embodiment of the resiliently deformable means is particularly simple and effective in the present application, with the single member 23 thus being permanently mounted on the moving portion of the cradle and being hinged together with the cradle about the axis 14 while still retaining a degree of longitudinal play enabling it to absorb excess length in the latching position by virtue of the sliding thrust provided by the tab 28. There is thus no danger of the member 23 being lost when the moving portion of the cradle is unlatched, nor is there any danger of it being badly positioned relative to the replaceable wiper when the moving portion is closed for latching purposes. All the operator needs to do is disengage the resilient latching lug 16 and raise the moving portion of the cradle in order to have direct and immediate access to the replaceable wiper.

The replaceable wiper 10 is thus properly positioned on the support and contact face 9 of the main body of the cradle, advantageously between two abutments 30 whose function is to hold said wiper longitudinally. The fact that the replaceable wiper 10 is merely placed on the support and contact face 9 means that said face may be formed with diamond-shaped points, which is naturally impossible with prior art designs in which the replaceable wiper is received by sliding. The diamond points penetrate slightly into the facing face of the replaceable wiper and the resulting multiplicity of contact points ensures excellent transmission of electrical current between said replaceable wiper and the cradle. In addition, these points take up any slack relative to the contact face of the replaceable wiper which is made by molding or drawing a bar of uniform cross-section from a carbon-impregnated composite. The regular distribution of these points naturally has a favorable effect from the thermal point of view since contact point heating is likewise uniformly distributed over the entire replaceable wiper.

The structure of the replaceable wiper and of the associated support and contact face make it possible to provide a disposition for the connection shunt 12 which is particularly advantageous by virtue of its compactness: the main body 8 of the cradle has a central connection portion 13 for clamping to the ends of the shunt 12 by means of screws 32, which ends thus extend between the side plates 33 of the main body of the cradle and then along the bore of a connection tube 34 which is hinged to said cradle on the part 4. Further, it may be observed that said tube 34 is surrounded by a sleeve 35 lying inside a guide tube 36 whose outside surface has, on each side, an outwardly projecting circular rib 37 which is received in a corresponding groove 38 provided in the associated side plate 33 on the inside of the main body of the cradle. The parts in friction contact 35 and 36 may naturally be constituted as a single part, for example using a material of the kind sold under the name ERTAFLUOR which continues to have good sliding characteristics at temperatures of more than 120° C.

Similarly, the central portion of the shunt 12 passes through a central sleeve 39 (preferably made of stainless steel) at the hinge with the end fitting 2 of the pole. This sleeve 39 is incorporated in the cradle swivel 4 when said swivel is cast and receives two external friction tubes 40 which are preferably made of a material having good sliding characteristics, for example the material sold under the name ERTALON, since this part does not need to withstand temperatures higher than 70° C. The end of the shunt 12 is finally connected to an electrical connector part 41 for providing connection to the cable 11.

A trolley bus head made as described above and in accordance with the invention is easily and quickly dismounted without using special tools in order to replace the replaceable wiper, and the replaceable wiper itself may be made in a particularly cheap manner without compromising in any way on the resulting electrical contact.

Naturally numerous modifications may be made to the embodiment described. In particular, the cross-section of the replaceable wiper may be different from that shown in FIG. 2, and the resiliently deformable means may also have structure which are quite different from that shown in FIG. 3. It will also be possible to use a different structure for the hinge connections through which the shunt passes, and in particular for the connection to the cradle which actually carries the replaceable wiper, for example by providing tubes with spring contact blades capable of transmitting current. In particular, these would serve to avoid transmitting current via the spring when the moving portion of the cradle is the only item in contact with a pickup line (as occurs at cross-overs and at points or switches).

A second variant of a trolley bus head in accordance with the invention is now described with reference to FIGS. 4 to 13, and this variant includes several parts which are analogous to corresponding parts in the trolley bus head described above. For the purposes of simplifying the description, components described below and corresponding to components described above have the same reference numerals plus 100.

In FIGS. 4 and 5, the head 101 comprises a pole end fitting 102 mounted at the end of an insulating tube 103. The body of the pole end fitting 102 is hinged to a cradle swivel 104 which is capable of pivoting about a slanting axis 105 through a predetermined angular range. A cradle 106 is mounted on the part 104 via a connection allowing the cradle to oscillate about a substantially vertical axis 107, with said cradle 106 being also capable of rocking about a substantially horizontal axis.

The cradle 106 comprises a main body 108 having a support and contact face 109 (described in greater detail below) for the bottom face of a replaceable wiper 110, with said support and contact face 109 being used for transmitting current to a cable 111 carried by the pole via a shunt 112 which is connected to cradle. The cradle also includes a moving portion 113 which is hinged about a shaft 114 carried by the main body 108, and which has a longitudinal opening for passing top portion of the replaceable wiper 110. The moving part 113 is symmetrical in shape having a pair of lugs 115 at each end, with one pair being provided for the hinge and with the other pair being provided to carry a resilient latching lug 116 capable of co-operating in a latching position with a molding 117 provided for this purpose on the main body of the cradle.

In accordance with an essential aspect of the invention, in this trolley bus head structure the shaft 114 about which the moving portion of the cradle is mounted to the main body 108 is capable of displacement in a direction substantially perpendicular to the support and contact face 109, with the moving portion 113 of the cradle having two rims 122 in the vicinity of the longitudinal opening 113 therethrough and in direct contact with the top side edges of the replaceable wiper 110. As in the above variant, resiliently deformable means are provided for holding the replaceable wiper 111 against the support and contact face 109 when the moving portion of the cradle is latched to the main body, however in this case these means comprise a spring member 142 acting on the hinge shaft 114 in such a manner as to exert the desired holding force on the moving portion 113 of the cradle.

As can be better seen in FIG. 6, each of the two side plates 113 of the main body 108 thus includes an oblong bearing 143 for receiving the associated end of the hinge shaft 114. It should be observed that the side plates 133 are of symmetrical shape so as to simplify manufacture thereof and so as to avoid errors in assembly. A molding 117 and an oblong bearing 143 are thus provided at each end of each side plate, even though it should be understood that an oblong bearing is required only for the hinge shaft 114 whereas the molding 117 is only required to co-operate with the latching clip 116.

Such a mounting causes the moving portion 113 to "float" in an extremely advantageous manner since it enables the rims 122 of the moving portion 113 to press directly against the wiper 110, as can be seen particularly well in FIG. 5. It will readily be understood that in the event of the wiper 110 losing electric contact with the pickup wire as the head passes line devices of the kinds mentioned above, the current is still picked up, but is transmitted directly by the cheeks of the moving portion 113, and in this case the current picked up by the cheeks is directly conveyed to the wiper 110 without passing through an intermediate member such as the spring having corrugated branches 23 as described in the preceding variant. The cheeks of the moving portion 113 thus provides two functions, i.e. they guide the pickup line 119 and they also provide a direct path for current picked up by electrical contact.

FIG. 11 shows a possible embodiment for the torsion spring 142 mounted on the main body 108 of the cradle. The spring is mounted on a shaft 144 passing through the lugs 145 of a plate 146 disposed between the side plates 133 and having a top portion 109 which constitutes the support and contact face for the replaceable wiper 110. When mounted in this way, the two free end branches 147 of the spring 142 press against the bottom face of the plate 146, while the branch 148 exerts a permanent pressure on the hinge shaft 114 urging it downwards. The spring 142 thus always tends to displace the shaft 114 towards the bottom portions of the oblong bearings 143. The hinge shaft 114 is shown as being square in section: this shaft thus has a sharp edge 149 against which the branch 148 of the torsion spring presses when the moving portion 113 of the cradle is in the latching position; this defines a notch for facilitating disengagement of the moving portion of the cradle and thus prevents it from snapping back on the fingers of the operator while interchanging wipers.

Advantageously, the latching member of the moving portion (in this case a clip 116) is capable of sufficient resilient deformation in order to serve, as does the torsion spring 142 but to a lesser extent, to provide a resilient holding function for holding the replaceable wiper 110 against the support and contact face 109 when the moving portion is latched to the main body. The moving portion of the cradle is then doubly floating.

The support and contact face 109 is advantageously constituted by contact springs having a certain degree of elasticity and disposed on the top face of the main body of the cradle. Thus, as shown in FIGS. 7 and 8, two plates 150 are disposed in a longitudinal groove 151 of the plate 146 of the main cradle body. These two plates 150 are disposed on either side of a central connection portion 131 for the main cradle body provided to receive the end of the shunt 112 passing through the hinge connections of the cradle. These contact blades provide better results than the diamond-shaped points provided on the contacts and support face of the head of the preceding variant: their flexibility provides good contact and take up the tolerance in the slack against the contact face of the replaceable wiper which may be molded or drawn in the form of a section bar of carbon-impregnated composite material.

The replaceable wiper 110 is thus accurately positioned on the support and contact face 109, for example by means of two abutments 130 whose function is to hold the wiper against longitudinal displacement (it would naturally be possible to provide the plate 146 with a perfectly smooth top face 152 as shown in FIGS. 7 and 8, in which case the wiper could be held in place by two transverse ribs provided across the moving portion 113 of the cradle, and this would facilitate machining the groove 151).

As in the preceding variant, the ends of the shunt 112 are fixed by means of screws 132 to the central connection portion 131, and these ends extend between the side plates 133 of the main body and then through the bore of a tube 134 providing a hinged link between the cradle and the part 104. The tube 134 is surrounded by a part 135 whose outside surface has an outwardly facing circular groove 138 in which an inwardly projecting circular rib 137 provided on each of the side plates 133 passes (it may be observed that this disposition is the opposite way around to that shown in the preceding variant where the circular rib was on the moving part and the groove in each side plate). The central portion of the shunt 112 then passes inside a sleeve 139 through the hinge to the pole end fitting 102, which sleeve receives two external tubes 140. The end of the shunt 112 is finally connected to an electrical connection piece 141 for providing a connection the cable 111.

FIGS. 9 and 10 show the structure of a replaceable wiper for fitting to the trolley bus head described above. This wiper comprises an elongate body of substantially constant cross-section, which section is trapezoidal in this case with its small base corresponding to a plane bottom face 153 which is to be pressed against the support and contact face of the main body of the cradle.

This particular cross-section is advantageous for two reasons: firstly it produces the area of the wiper which comes into direct contact with the spring blades, thereby ensuring that the bottom face 153 is always in contact with the spring blade and never comes into contact on the adjacent top plate 152 of the plate; secondly this makes it possible to save up to 20% of wiper material while still retaining optimum behavior of the wiper in the face of wear due to the lateral facets being parallel.

The wiper thus includes two parallel facets 154 adjacent to the top side edges against which the rims 122 of the moving portion 113 are pressed when in the latching position, followed by two inclined faces 155 which meet the bottom plane face 153. Each of the inclined faces 155 preferably forms an angle of about 30° with the adjacent facet 154 (the angle marked gamma in FIG. 10). The end faces 156 are essentially plane and perpendicular to the general direction of the elongate body, except that on their top edges 157 they are advantageously at an angle relative to said direction, which angle beta (see FIG. 9) is about 30°, in this case.

As in the preceding variant, a trolley bus head made in this way is quick and easy to dismount and does not require special tools when replacing one wiper by another, and such replacement can be performed particularly cheaply without degrading the resulting electrical contact in any way.

Naturally various modifications may be made to the embodiments described: in particular, the cross-section of the replaceable wiper may be different from those shown, and the resiliently deformable means may also be quite different from those shown in the figures. Finally, the hinges through which the shunt passes may also be quite different, and in particular the hinge to the cradle carrying the replaceable wiper may be quite different.

FIGS. 12 and 13 show a variant link between the cradle 106 and the swivel part 104, and more particularly between the tube 134 as shown in FIG. 4 and the part 104. In this variant, the tube 134 has an additional degree of freedom by virtue of a hinged mounting on the part 104. The tube 134 is mounted on an upsidedown U-shaped bridge 158 by means of a nut 159 and a washer 160. The bridge 158 is mounted to oscillate about a fixed axis 161, and a spring 162 serves to hold the bridge against a transversal abutment 163. The spring 162 in this case is a torsion spring mounted the fixed axis 161 and the two end branches 164 are both received in respective associated notches 165 provided in the part 104, although a ball snap fastening system using a rated compression spring could also be used. In this manner, if the trolley bus head escapes from the associated line, any mechanical shock against a line-supporting transverse wire automatically causes the head to retract (see the position shown in dot-dashed lines in FIG. 12), thereby avoiding the head breaking (for example the part 135 thereof) or breaking a line-supporting transverse member, which would be even more serious.

The invention is not limited to the embodiments described above but covers any variant which comes within the scope of the accompanying claims.

We claim:

1. A trolley bus head comprising a cradle swivel pivotally mounted at the end of a pole, a cradle mounted on the cradle swivel by means of a connection allowing oscillation about a substantially vertical axis and rocking about a substantially horizontal axis, said cradle receiving a replaceable wiper for transmitting current to a cable mounted on the pole via a shunt connected to the cradle, the head including the improvement whereby the cradle comprises a main body having a support and contact face for engaging a bottom portion of the replaceable wiper, and a moving portion which is latchable on said main body, said moving portion being hinged about an axis carried on said main body and having a longitudinal opening through which a top portion of the replaceable wiper passes, resiliently deformable means being provided for holding the replaceable wiper against the support and contact face when the moving portion is latched against the main body, wherein the replaceable wiper has two longitudinally extending fins at the bottom thereof for co-operating with the moving portion of the cradle in order to hold said replaceable wiper against the support and contact face using said resiliently deformable means.

2. A trolley bus head according to claim 1, wherein the resiliently deformable means comprise two corrugated branches, with each corrugated branch being housed, when said moving portion is latched against the main body, between a corresponding longitudinally extending fin of the replaceable wiper and an associated rim provided on the moving portion of the cradle in the vicinity of its longitudinal opening.

3. A trolley bus head according to claim 2, wherein the resiliently deformable means are in the form of a single part carried by the moving portion of the cradle.

4. A trolley bus head according to claim 3, wherein said single part has a connection tab which surrounds the hinge axis of the moving portion of the cradle.

5. A trolley bus head according to claim 4, wherein said single part is generally rectangular in shape having an opening for passing the top portion of the replaceable wiper.

6. A trolley bus head according to claim 1, wherein the main body of the cradle has a support and contact face covered with diamond-shaped points.

7. A trolley bus head according to claim 1, wherein the main body of the cradle has an abutment located at each end of its support and contact face and serving to hold the replaceable wiper against longitudinal displacement.

8. A trolley bus head according to claim 1, wherein the main body of the cradle has a central connection portion which receives one end of a shunt passing through the oscillating connection of the cradle.

9. A trolly bus head comprising a cradle swivel pivotally mounted at the end of a pole, a cradle mounted on the cradle swivel by means of a connection allowing oscillation about a substantially vertical axis and rocking about a substantially horizontal axis, said cradle receiving a replaceable wiper for transmitting current to a cable mounted on the pole via a shunt connected to the cradle, the head including the improvement whereby the cradle comprises a main body having a support and contact face for engaging a bottom portion of the replaceable wiper, and a moving portion which is latchable on said main body, said moving portion being hinged about an axis carried on said main body and having a longitudinal opening through which a top portion of the replaceable wiper passes, resiliently deformable means being provided for holding the replaceable wiper against the support and contact face when the moving portion is latched against the main body, wherein the moving portion of the cradle is hinged about a shaft mounted on the main body of said cradle, said shaft being mounted free to move transversely in a direction which is substantially perpendicular to the support and contact face, said moving portion including two rims in the vicinity of the longitudinal opening and coming into direct contact with top side edges of the replaceable wiper, and wherein said resiliently deformable means comprise a spring member acting on the hinge shaft in such a manner as to exert a force on the moving portion of the cradle suitable for maintaining the replaceable wiper against the support and contact face, the resiliently deformable means include a latching clip mounted on the other end of the moving portion of the cradle.

10. A trolley bus head according to claim 9, wherein the main body of the cradle includes oblong bearings receiving the ends of the hinge shaft.

11. A trolley bus head according to claim 9, wherein the spring member is a torsion spring mounted on the main body of the cradle and having at least one branch pressing against the hinge shaft.

12. A trolley bus head according to claim 11, wherein the hinge shaft has a sharp edge against which the branch of the torsion spring presses when the moving portion of the cradle is in the latched position.

13. A trolley bus head according to claim 9, wherein the support and contact face is centrally constituted by contact blades having a degree of resilience and disposed on the top face of the main body of the cradle.

14. A trolley bus head according to claim 13, wherein the contact blades are in the form of at least one plate disposed in a longitudinal groove on the main body of the cradle.

15. A trolley bus head according to claim 13, wherein two such plates are provided, disposed on either side of a central connection portion of the main body of the cradle for receiving one end of a shunt which passes through the mountings allowing the cradle to swivel and oscillate.

16. A trolley bus head according to claim 9, further including means for retracting the cradle in the event of a mechanical shock when said head escapes from the pickup line.

17. A trolley bus head according to claim 15, wherein the cradle is mounted to oscillate about a tube which is in turn mounted on a bridge capable of tilting about a fixed axis to retract said cradle, said bridge being normally pressed against an abutment by resilient means.

18. A trolley bus head according to claim 17, wherein said resilient means are constituted by a torsion spring mounted on the fixed axis.

19. A replaceable wiper for fitting to a trolley bus head according to claim 9, wherein said wiper is constituted by an elongate body of essentially constant cross-section, said cross-section being substantially trapezoidal in shape with the small base corresponding to a bottom plane face pressing against the support and contact face of the main body of the cradle.

20. A replaceable wiper according to claim 19, including two parallel facets adjacent to the top side edges thereof against which associated rims of the moving portion of the cradle are pressed, followed by two inclined faces running to said bottom plane face of said replaceable wiper.

21. A replaceable wiper according to claim 20, wherein each of said inclined faces is at an angle of about 30° with the adjacent facet.

* * * * *